United States Patent
Oseman

Patent Number: 5,139,274
Date of Patent: Aug. 18, 1992

[54] SEAL FOR A HYDRAULIC RAM

[76] Inventor: Gavin S. Oseman, 423 Pickersleigh Rd., Malvern, Worcestershire WR14 2QJ, Great Britain

[21] Appl. No.: 602,243
[22] PCT Filed: Mar. 8, 1990
[86] PCT No.: PCT/GB90/00348
§ 371 Date: Dec. 12, 1990
§ 102(e) Date: Dec. 12, 1990
[87] PCT Pub. No.: WO90/10808
PCT Pub. Date: Sep. 20, 1990

[30] Foreign Application Priority Data
Mar. 11, 1989 [GB] United Kingdom ............... 8905621

[51] Int. Cl.$^5$ .............................................. F16J 15/56
[52] U.S. Cl. ............................ 277/58; 277/27; 277/29; 277/177; 277/205
[58] Field of Search ............... 277/27, 177, 205, 58, 277/124, 125, 173, 216, 178, 165, 174, 29

[56] References Cited
U.S. PATENT DOCUMENTS

| | | | |
|---|---|---|---|
| 2,941,544 | 6/1960 | Peras | 137/525 |
| 3,195,901 | 7/1965 | Mercier | 277/58 |
| 3,351,350 | 11/1967 | Shepler | 277/124 |
| 3,771,799 | 11/1973 | Sekulich | 277/58 X |
| 4,186,929 | 2/1980 | Burton et al. | 277/27 |
| 4,189,157 | 2/1980 | Mahan et al. | 277/27 X |
| 4,262,759 | 4/1981 | Young et al. | 277/205 X |
| 4,387,901 | 6/1983 | Ritsema | 277/165 |
| 4,579,041 | 4/1986 | Organ et al. | 277/165 X |
| 4,696,223 | 9/1987 | Link et al. | 92/86.5 |
| 4,702,482 | 10/1987 | Oseman | 277/177 X |
| 4,848,778 | 7/1989 | Von Pragenau | 277/27 X |
| 4,867,460 | 9/1989 | Colo et al. | 277/216 X |
| 4,944,498 | 7/1990 | Körtgen et al. | 277/177 X |

FOREIGN PATENT DOCUMENTS

| | | |
|---|---|---|
| 0104504 | 4/1984 | European Pat. Off. . |
| 0299431 | 1/1989 | European Pat. Off. . |
| 2423934 | 11/1975 | Fed. Rep. of Germany . |
| 573048 | 11/1945 | United Kingdom . |
| 1448530 | 9/1976 | United Kingdom . |
| 2219050 | 11/1989 | United Kingdom . |

Primary Examiner—William A. Cuchlinski, Jr.
Assistant Examiner—James K. Folker
Attorney, Agent, or Firm—Young & Thompson

[57] ABSTRACT

A hydraulic seal for sealing between two hydraulic components (1, 2) that move axially one within the other comprises a first pressure-energized ring seal (3) located between the components so as to respond to hydraulic pressure on an axially directed inner face of the seal, and a second ring seal (7) located adjacent the inner face of the first seal (3) so as to control the flow of hydraulic fluid to the first seal. The second ring seal (7) is located in an annular groove (8) in one of the components (1) with an outer annular face (11) that is directed axially towards the first seal (3) and lies opposite an adjacent side wall (13) of the groove (8) to be supported thereby. A sealing lip (9) protrudes from the groove (8) and has a radially directed annular sealing face (15) to engage in face-to-face contact with the other of the components (2). An annular inner face (14) of the second ring seal is angled within the groove (8) away from an adjacent side wall (13) of the groove and towards the sealing lip (9) so that the sealing lip can flex within the groove (8) away from the first seal (3) to release excess pressure between the first and second seals.

9 Claims, 1 Drawing Sheet

_SEAL FOR A HYDRAULIC RAM_

TECHNICAL FIELD

This invention relates to fluid seals for sealing between relatively moveable members such as the piston rod and cylinder of a hydraulic ram.

It is known to prevent leakage beween the piston rod and cylinder of a hydraulic ram using a pressure-energised seal such as a U-ring seal, which responds to hydraulic pressure by expanding radially to apply a sealing force between the rod and cylinder. In order to improve sealing at low pressures, it is also known to provide a second ring seal between the hydraulic pressure source and the first seal so as to control fluid flow to the first seal and help maintain an inter-seal pressure to energise the first seal. The second ring seal conventionally takes the form of a plain rectangular-section ring which has a relatively broad annular sealing face in contact with the piston rod. This type of seal is commonly known as a buffer ring and, besides forming a low pressure seal, it has the additional function of protecting the U-ring seal against damage by limiting the transmission of pressure pulses and particulate impurities in the hydraulic fluid within the ram.

A problem met in the aforesaid type of double seal arrangement is that the inter-seal pressure can, under some circumstances, build-up to excessive levels, increasing the friction forces resisting operation of the ram, possibly damaging the seals and, in the extreme, causing the ram to seize.

DISCLOSURE OF THE INVENTION

An object of the present invention is to provide a gland seal for a hydraulic ram comprising a double seal arrangement which avoids excessive inter-seal pressures.

According to the invention, a hydraulic seal for sealing between two hydraulic components that move axially one within the other comprises a first pressure-energised ring seal located between the components so as to respond to hydraulic pressure on an axially directed inner face of the seal, and a second ring seal located adjacent said inner face of the first seal so as to control the flow of hydraulic fluid to the first seal, the second ring seal being located in an annular groove in one of said components with an outer annular face that is directed axially towards the first seal and lies opposite an adjacent side wall of the groove to be supported thereby and with a sealing lip that protrudes from said groove and has a radially directed annular sealing face to engage in face-to-face contact with the other of said components, characterised in that an annular inner face of the second ring seal opposite said outer face is angled within said groove away from an adjacent side wall of the groove and towards the sealing lip so that the sealing lip can flex within the groove away from the first seal to release excess pressure between the first and second seals.

In a preferred embodiment of the invention, the second ring seal has a substantially rectangular section except that the corner at the junction of the inner face and sealing lip is bevelled to produce said angled inner face. Thus the second ring seal can be simple in design, being a modified form of a conventional buffer ring.

Further, it will be appreciated that the second ring seal can be readily designed so that the sealing lip flexes to relieve inter-seal pressure at any predetermined level. For example, the angle of the inner face, the overall width of the seal, and the width of the sealing lip can be varied. The materials of which the seal is composed will also determine the relief pressure level at which it will respond.

DESCRIPTION OF THE DRAWING

The invention will now be described by way of example with reference to the accompanying drawing in which.

BEST MODE OF CARRYING OUT THE INVENTION

Figure 1:
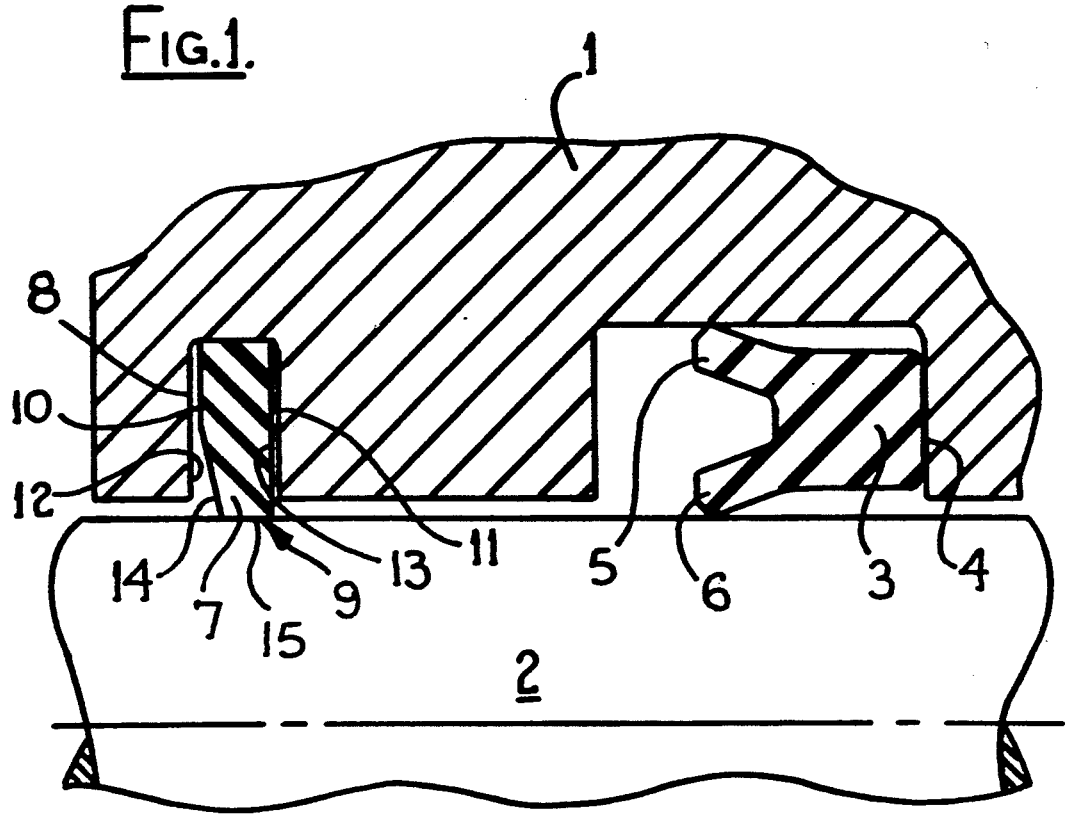
FIG. 1 is an axial section through part of a hydraulic ram fitted with a gland seal according to the invention.

FIG. 1 shows the rod end of a hydraulic ram comprising a cylinder housing 1 and a piston rod 2. An elastomeric U-ring seal 3 is provided between the housing 1 and piston rod 2 to seal against the escape of hydraulic fluid from within the housing 1. The U-ring seal 3 is located within a rectangular section annular groove 4 in the housing 1 and the U-section of the seal opens axially inwardly of the housing 1 so that hydraulic pressure therein causes the two annular limbs 5, 6 of the seal to expand radially and form a seal with the housing 1 and piston rod 2, respectively.

A second ring seal 7 is provided axially inwardly of the first seal 3, and is located in an annular rectangular section groove 8 in the housing 1, so that a sealing lip 9 at its radially inner edge protrudes from the groove and has an inwardly directed annular contact face 15 which engages the piston rod in face-to-face contact to form a seal between the housing 1 and the piston rod 2. This second seal 7 has a substantially rectangular cross-section adapted to fit within the groove 8 with respective inner and outer axially directed annular faces 10, 11 lying opposite adjacent side walls 12, 13 of the groove 8. The inner face 10 of the second seal 7 facing away from the first seal 3 is modified at the corner by bevelling so as to form an angled face 14 that extends away from the adjacent side wall 12 towards the contact face 15.

The provision of this angled face 14 allows the sealing lip 9 of the second seal to flex within the groove 8 in response to excess hydraulic pressure in the inter-seal space between the first and second seals. The tapered shape of the seal gives it flexibility, and the space between the angled face 14 and adjacent side wall 12 of the groove accommodates displacement of the seal. The face-to-face contact between the outer annular face 11 of the seal and the adjacent side wall 13 of the groove supports the seal against flexing so that the seal acts as a one-way relief valve only. The seal 7 therefore acts as a conventional buffer ring in protecting the U-ring seal 3 against damage by limiting the transmission of pressure pulses and particulate impurities in the hydraulic fluid within the ram housing 1.

Figure 2:
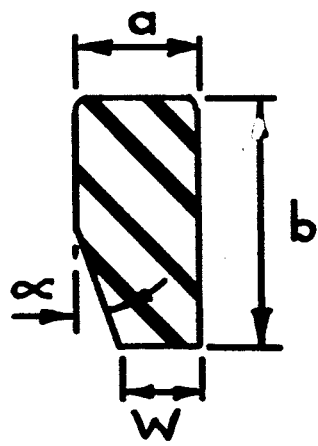
FIG. 2 is a section through the second ring seal in FIG. 1.

The inter-seal pressure level at which the second ring seal 7 operates to relieve pressure is determined by the geometry of the cross-section of the seal. Typically, as shown in FIG. 2, the ring seal has overall dimensions in the ratio a:b of 1:2 and w:a of 2:3, and bevel angle $\alpha = 20$ degrees. The seal would typically be formed o polyurethane with hardness 95 Shore A, tensile strength 55 N/mm$^2$ and elongation at break of 55 percent. The relief pressure required for a hydraulic ram is typically 100 to 200 bar at room temperature. It will be appreciated that the dimensions a, b, w and bevel angle $\alpha$ can all be varied, together with the properties of the material used to make the seal, in order to vary the relief pressure at which it responds.

The dimensions a, b, w and angle $\alpha$ and the material properties must be such as to allow sufficient flexing of the seal to produce the pressure relief action. For example, if the ratio w:a and angle $\alpha$ are too large, the seal is less likely to flex. Typically, a ratio of w:a > 3:4 and a bevel angle $\alpha$ > 25 degrees will not produce the pressure relief action. Also, any ring seal with a bevel angle $\alpha$ > 40 degrees is unlikely to produce the pressure relief action.

It will be appreciated that the first ring seal 3 can take any form besides a U-ring seal provided that it is energised by the hydraulic pressure within the ram housing 1.

I claim:

1. A hydraulic seal for sealing between two hydraulic components that move axially one within the other, said seal comprising a first pressure-energized ring seal located between the components so as to respond to hydraulic pressure on an axially directed inner face of the seal, and a second ring seal located adjacent said inner face of the first seal so as to control the flow of hydraulic fluid to the first seal, said second ring seal being composed of a resilient material and being located in an annular groove in one of said components so that a sealing lip thereof protrudes radially from the groove and has a radially directed annular sealing face to engage in face-to-face sealing contact with the other of said components, said second ring seal having inner and outer axially directed annular faces that bound said sealing lip and sealing face on opposite sides thereof and cooperate with respective adjacent side walls of the groove, said outer annular face being directed axially toward the first seal and being supported by said respective adjacent side wall of the groove, and said inner annular face comprising means that extends from within the groove to said sealing face and which is angled away from said respective adjacent side wall of the groove toward said sealing face so as to leave a space between said side wall and said inner annular face to accommodate resilient axially flexing of the sealing lip away from the first ring seal to release excess pressure between the first and second seals.

2. A seal as claimed in claim 1 in which said inner annular face has a portion within the groove substantially parallel to said adjacent side wall of the groove and which terminates in said angled means.

3. A seal as claimed in claim 1 in which said outer annular face is substantially parallel to said adjacent side wall of the groove.

4. A seal as claimed in claim 1 in which said second ring seal is substantially rectangular in section except for one corner thereof which is bevelled by said angled means.

5. A seal as claimed in claim 1 in which said first pressure-energized ring seal is a U-ring seal having a recess in said inner face which is pressurizable by said hydraulic pressure.

6. A seal as claimed in claim 1, wherein the second ring seal (7) has the ratio of the width (w) of the annular sealing face (15) to the overall width (a) of the seal less than 3:4.

7. A seal as claimed in claim 6, wherein the second ring seal (7) has the angle between said angled means (14) and the adjacent side wall (12) of the groove (8) less than 25°.

8. A seal as claimed in claim 1, wherein the second ring seal (7) has the angle between said angled means (14) and the adjacent side wall (12) of the groove (8) less than 40°.

9. A seal as claimed in claim 1, wherein the second ring seal (7) is composed of polyurethane.

* * * * *